(12) United States Patent
Bartlett et al.

(10) Patent No.: US 10,564,024 B2
(45) Date of Patent: Feb. 18, 2020

(54) SENSOR FOR REMOTE MEASUREMENT OF FLUID DEPTH IN ENVIRONMENTAL MONITORING

(71) Applicant: FTS Forest Technology Systems Ltd., Victoria (CA)

(72) Inventors: Philip Bartlett, Victoria (CA); Mike Argyle, East Smithfield, UT (US); Levente Busas, Victoria (CA); Roger Williams, Victoria (CA)

(73) Assignee: FTS FOREST TECHNOLOGY SYSTEMS LTD (CA)

( * ) Notice: Subject to any disclaimer, the term of this patent is extended or adjusted under 35 U.S.C. 154(b) by 265 days.

(21) Appl. No.: 15/737,274

(22) PCT Filed: Jun. 17, 2016

(86) PCT No.: PCT/CA2016/000173
§ 371 (c)(1),
(2) Date: Dec. 15, 2017

(87) PCT Pub. No.: WO2016/201548
PCT Pub. Date: Dec. 22, 2016

(65) Prior Publication Data
US 2018/0180460 A1  Jun. 28, 2018

Related U.S. Application Data

(60) Provisional application No. 62/181,577, filed on Jun. 18, 2015.

(51) Int. Cl.
*G01F 23/14* (2006.01)
*G01F 23/16* (2006.01)
*G01F 23/00* (2006.01)

(52) U.S. Cl.
CPC ............ *G01F 23/168* (2013.01); *G01F 23/00* (2013.01); *G01F 23/14* (2013.01); *G01F 23/165* (2013.01)

(58) Field of Classification Search
CPC .... G01F 23/165; G01F 23/167; G01F 23/168; G01F 23/14
See application file for complete search history.

(56) References Cited

U.S. PATENT DOCUMENTS 4,388,827 A    6/1983  Palmer et al.
4,669,309 A *  6/1987  Cornelius ............... G01F 23/14
                                                   73/299

(Continued)

OTHER PUBLICATIONS

International Search Report issued in PCT/CA2016/000173 dated Aug. 30, 2016 (3 pages).

(Continued)

*Primary Examiner* — Herbert K Roberts
(74) *Attorney, Agent, or Firm* — Baumgartner Patent Law; Marc Baumgartner

(57) ABSTRACT

A pneumatic depth sensor system for remotely reporting on a depth of a body of fluid is provided. The system comprises a regulated source of compressed gas, a first pressure sensor upstream from a normally-closed electronic solenoid valve, a second pressure sensor downstream from the electronic solenoid valve and a bubbler outlet downstream from the second pressure sensor, the bubbler outlet for locating at a bottom of the body of fluid, the depth sensor system under control of a microprocessor, the microprocessor in electronic communication with the first and second pressure sensors and the normally-closed electronic solenoid valve, and configured to instruct the normally-closed electronic solenoid valve to be in a fully open position or a fully closed position and to rapidly change position in response to a pressure reading from the second pressure sensor.

10 Claims, 6 Drawing Sheets

(56) References Cited

U.S. PATENT DOCUMENTS

| | | | |
|---|---|---|---|
| 4,949,572 A * | 8/1990 | Wilen | G01N 9/28 |
| | | | 73/302 |
| 5,047,124 A | 9/1991 | Haberland | |
| 5,052,222 A * | 10/1991 | Stoepfel | G01C 13/008 |
| | | | 114/244 |
| 5,983,716 A | 11/1999 | Felder et al. | |
| 6,510,736 B1 | 1/2003 | Van Ee | |
| 6,601,449 B1 | 8/2003 | Jones et al. | |
| 6,647,781 B2 * | 11/2003 | Su | G01F 23/168 |
| | | | 73/290 R |
| 7,895,890 B2 | 3/2011 | Van Ee | |
| 8,340,929 B2 | 12/2012 | Smaidris et al. | |
| 8,521,452 B2 | 8/2013 | Smaidris et al. | |
| 8,756,991 B2 | 6/2014 | Edwards | |
| 2003/0140697 A1 | 7/2003 | Van Ee | |

OTHER PUBLICATIONS

Written Opinion issued in PCT/CA2016/000173 dated Aug. 30, 2016 (5 pages).

* cited by examiner

US 10,564,024 B2

SENSOR FOR REMOTE MEASUREMENT OF FLUID DEPTH IN ENVIRONMENTAL MONITORING

CROSS REFERENCE TO RELATED APPLICATIONS

This application is a U.S. national phase of International Application No. PCT/CA2016/000173, filed Jun. 17, 2016 and, is related to, and claims the benefit of, U.S. Provisional Patent Application No. 62/181,577, filed Jun. 18, 2015. The above-identified priority patent applications are incorporated herein by reference in their entirety.

FIELD

The present technology is a system for remotely sensing fluid depths in lakes, ponds, rivers, streams and the like. More specifically, it is a system that accurately and reliably measures fluid depth based on pressure differential across a modulating, large orifice valve.

BACKGROUND

Remote sensing of the depth of a liquid, for example, in a tailings pond, river, stream, lake or pond, brings with it special challenges. There are many methods of measuring depth of a body of liquid. Some of these rely upon pressurizing a pipe or tube that has an outlet at the depth to be measured such that the pressure in the tube is proportional to the depth of the liquid at the outlet. The pressurized gas source is located at or above the surface. Such methods are not suitable for remote sensing.

Historically, a nitrogen tank, regulator and needle valve to regulate the gas flow have been used. This relied upon a human to operate the needle valve and hence could be done in remote locations, but not remotely.

More recently, the nitrogen tank was replaced with a compressor run on solar power or battery power and the needle valve was replaced with a pressure differential across an orifice. While this allowed for remote sensing, it led to new challenges. First is that the pressure from the compressor is not very tightly controlled. The solution to this problem is to use a valve with a very small orifice. The problem that arises from this is that the orifice can be easily partially or completely occluded. Another problem is that if a fixed orifice valve is used, it requires calibration because there is significant variability in the size of a fixed orifice that must be measured during manufacturing to calibrate the air flow for a given pressure differential. The prior art fails to address these challenges.

For example, United States Patent Application 20030140697 discloses a liquid depth sensing system utilizing the bubble tube or purge operating principle. In this system, a pneumatic tube extends downwardly into the liquid, and air (or other gas) passes through the tube to bubble from the lower end thereof. The air or gas pressure within the tube is equal to the head pressure of the liquid, thus allowing the liquid depth to be determined by measuring the air or gas pressure. The technology uses a pneumatic pump motor as the regulating device, by operating the motor only as required to produce only sufficient pressure for measuring the liquid depth. In some embodiments, a regulator valve provides adjustment of the output flow from the pump for additional accuracy. In other embodiments, a differential pressure transducer provides feedback to the motor controller to preclude requirement for the regulator valve. This application does not contemplate nor solve the problem of a partially or fully occluded orifice or the need for calibration.

U.S. Pat. No. 8,756,991 discloses a pneumatic sensor/indicator device that includes a sensor assembly having a bellows receiving chamber and sensor housing. An elastic bellows is in the bellows receiving chamber. A shaft connects to the bellows so bellows extension/retraction causes shaft axial movement. A magnet connected to the shaft generates a field moving an indicator ring. An indicator dome connects to the sensor body. The indicator ring is in the sensor housing in a non-indicating condition and displaces into the indicator dome providing a visible indicating condition. A flexible sensor tube connected to the sensor/indicator device extends into a well tube having a level sensing tube extending therefrom. A well fluid level rising above a level sensing tube inlet end increases inlet pressure port pressure inducing bellows axial displacement causing indicator device movement toward the indicating condition. The dome and indicating ring are isolated from the well preventing well contents entering and fogging the dome. This technology is specific to wells. It is not suited to remote sensing as a user is required to view the sensor output on site.

U.S. Pat. No. 8,521,452 discloses a liquid level determination system that includes pressure determination components that include an interference dampener to mitigate interference originating from a bubbler air compressor. The system may include a pressure pipe with a pressure sensing pipe end located adjacent to the pressure determination components and a bubbler pipe end locatable at least partially in a wet well. The wet well may include a pump that has a volute. The pressure pipe may further include layered pipe sections, and the position of the bubbler pipe end may be calculated so that it is not lower than a level substantially equivalent to a center line through the volute. The bubbler air compressor may provide air pressure to the pressure pipe. The technology is focused on an interference damper to mitigate interference originating from a bubbler air compressor, such as oscillations in pressure. The transducer has an orifice of about 3 to 7 microns. The solution appears to be through a computer programme and also a sensor plug. It does not address the issue of a fully or partially occluded orifice or calibration.

U.S. Pat. No. 8,340,929 discloses a liquid level determination system to determine the level of a liquid in a wet well. The system may include pressure determination components and a pressure pipe with a pressure sensing pipe end located adjacent to the pressure determination components and a bubbler pipe end locatable at least partially in the wet well. A transducer is used to determine a pressure level within the pressure pipe maintained by a bubbler air compressor. A level detection processor may analyze the pressure level to determine a liquid level in the wet well. An interference dampener is included to mitigate interference originating from the bubbler air compressor. The interference dampener may be provided by transducer plug to restrict air flow. Alternatively, the interference dampener may be provided by a computer operated program to monitor and mitigate the interference. The technology does not consider, nor solve the problem of a fully or partially occluded orifice or calibration.

U.S. Pat. No. 7,895,890 discloses a liquid depth sensing and identification system that determines both the pressure head or depth, and therefore the quantity, of a liquid in a tank, as well as determining the characteristics of the liquid at the bottom of the probe. Two principles of operation are disclosed herein. The system may use a gas bubble collector about the outlet end of the purge tube, with the difference in height of the collector and purge tube mouths defining the very small difference in pressure head required to resolve the bubble emission characteristics produced in different liquids. Alternatively, the system incorporates a mass flow sensor capable of detecting minute changes in mass flow as bubbles are emitted from the purge tube in order to determine the type and characteristics of the liquid. The system operates using an open loop principle of operation, with no feedback provided to control the purge pump. This technology does not consider nor solve the problem of a fully or partially occluded orifice or calibration.

U.S. Pat. No. 5,983,716 discloses a procedure for measuring hydrostatic pressure, especially that of ground water, with the particularity that air is bubbled into the ground water, the pressure in the measuring pipe is fed to an absolute pressure cell and atmospheric pressure is then applied to the same measurement cell. It includes a valve that opens and closes but in response to the position of pistons that deliver pressurized air into the system to provide the bubbles. This is old technology that is not suitable for remote sensing.

U.S. Pat. No. 5,047,124 discloses an apparatus for feeding gas into a heated saline solution for pressure measurement or to pump this solution. The gas is introduced into the solution through a gas bubbling-in pipe having a gas outlet opening. The gas is heated prior to being introduced into the solution and is charged with moisture until the saturation of the gas comes close to or corresponds to the saturation conditions in the solution at the gas outlet opening. This minimizes clogging caused by crystallization at the feeder pipes carrying the measuring or purge gas. This technology is providing one solution to clogging, but at the gas outlet. The patent discloses that wider tubing can be used. This unfortunately reduces the accuracy of the measurements.

What is needed is a system and method that allows for accurate and reliable remote sensing of the depth of liquids. The system will preferably reduce or eliminate the need for calibration, will be robust enough for many environmental conditions and will preferably reduce or eliminate clogging, while remaining highly accurate. It should preferably be minimally affected by variations in gas pressure from the compressor.

SUMMARY

The present technology provides a system and method that allows for accurate and reliable remote sensing of the depth of liquids. The system reduces or eliminates the need for calibration, is robust enough for many environmental conditions and reduces or eliminates clogging, while remaining highly accurate through the use of a normally-closed electronic solenoid valve with a large diameter orifice that very rapidly opens and very rapidly closes, such that it is essentially only open or closed. Despite its accuracy, it is minimally affected by variations in gas pressure from the compressor. Pressure sensors provide pressure data to a microprocessor that controls the system. This allows for better regulation of the flow of air and the pressure of the air. As a consequence, the compressor does not need as much power, making its power consumption low enough for small solar panels or small batteries to provide sufficient power.

In one embodiment, a depth sensor, for use with a regulated source of a compressed gas and a power source, for measuring depth of a fluid in a remote location is provided, the depth sensor comprising a supply gas line, a first pressure sensor line, a first pressure sensor, an normally-closed electronic solenoid valve, a bubbler gas line, a second pressure sensor line, a second pressure sensor and a microprocessor, the supply gas line in fluid communication with the first pressure sensor line and the normally-closed electronic solenoid valve, the bubbler gas line in fluid communication with the second pressure sensor line, and terminating in a bubbler outlet, the first and second pressure sensor lines in fluid communication with the first and second pressure sensors, respectively, the microprocessor in electronic communication with the pressure sensors and the normally-closed electronic solenoid valve, the microprocessor configured to modulate pressure and flow rate of the compressed gas by instructing the normally-closed electronic solenoid valve to oscillate rapidly between an opened or a closed position and to not be partially opened.

In the depth sensor, the microprocessor may be configured to instruct the normally-closed electronic solenoid valve to operate at a frequency and a duty cycle in response to a pressure reading by the second pressure sensor in relation to a time.

In the depth sensor, the normally-closed electronic solenoid valve may have a response time between the opened and the closed position of about 1 to about 10 milliseconds.

The depth sensor may further comprise a check valve in the supply gas line.

The depth sensor may further comprise an expansion tank, the expansion tank in fluid communication with the gas supply line.

In the depth sensor the normally-closed electronic solenoid valve may have an orifice with an inside diameter of about 0.635 mm inside diameter to about 3 mm.

In another embodiment, a pneumatic depth sensor system for use with a power source is provided, the sensor system for remotely reporting on a depth of a body of fluid, the system comprising a regulated source of compressed gas, a first pressure sensor upstream from a normally-closed electronic solenoid valve, a second pressure sensor downstream from the normally-closed electronic solenoid valve and a bubbler outlet downstream from the second pressure sensor, the bubbler outlet for locating at a bottom of the body of fluid, the depth sensor system under control of a microprocessor, the microprocessor in electronic communication with the first and second pressure sensors and the normally-closed electronic solenoid valve, and configured to instruct the normally-closed electronic solenoid valve to be in a fully open position or a fully closed position and to rapidly change position in response to a pressure reading from the second pressure sensor.

The pneumatic depth sensor system may further comprise an expansion tank, the expansion tank upstream from the first pressure sensor.

In the pneumatic depth sensor system the pressure sensors may be piezo-resistive differential pressure sensors.

In the pneumatic depth sensor system the regulated source of compressed gas may be an air compressor.

The pneumatic depth sensor system may further comprise an air dryer upstream of the compressor.

In the pneumatic depth sensor system the bubbler outlet may have an inside diameter of about 1.58 mm to about 12.7 mm.

In the depth sensor system the normally-closed electronic solenoid valve may have a response time between the fully opened and the fully closed position of about 1 to about 10 milliseconds.

The depth sensor system may further comprise the power source.

In the depth sensor system the power source may be at least one solar panel.

In the depth sensor system, the power source may further comprise at least one battery.

In another embodiment, a method of remotely measuring the depth of a body of fluid is provided, the method comprising: utilizing a regulated source of pressurized gas, a gas supply system, the gas supply system including a supply gas line, a bubbler gas line terminating in a bubbler outlet, a first pressure sensor in fluid communication with the supply gas line, a second pressure sensor in fluid communication with the bubbler gas line, and a normally-closed electronic solenoid valve in fluid communication with and located between the supply gas line and the bubbler gas line, and a microprocessor in electronic communication with the gas supply system; locating the bubbler outlet at the bottom of the body of fluid; pressurizing the gas supply system to expel a stream of bubbles from the bubbler outlet; rapidly modulating, under control of the microprocessor, the normally-closed electronic solenoid valve between a fully open position and a fully closed position; measuring a pressure; and calculating a depth of the body of fluid.

In the method an output from the second pressure sensor may be measured periodically by the microprocessor to determine the depth of the body of fluid.

The method may further comprise reporting the depth of the body of fluid.

In the method reporting may be to a logging and telemetry system.

In the method the normally-closed electronic solenoid valve may have an orifice with an inside diameter of about 0.635 mm inside diameter to about 3 mm inside diameter.

In the method the normally-closed electronic solenoid valve may cycle between the fully open position and the fully closed position in about 5 milliseconds to about 10 milliseconds.

In the method the normally-closed electronic solenoid valve may be in the open position for about 10 milliseconds to about 250 milliseconds.

In the method the normally-closed electronic solenoid valve may be in the open position for about 10 milliseconds.

In the method, the body of fluid may be a body of water.

In the method, the body of water may be a river, a stream, a lake, a pond, a swamp or a bog.

FIGURES

DESCRIPTION

Definitions

Normally-closed—in the context of the present technology, a normally closed valve is one that has a fast response time, in the order of 1 to 5 or 10 milliseconds (msec) such that unless it is open, it is closed, with virtually no time between the open and the closed position.

Figures 1A, 1B, 1C, 1D:
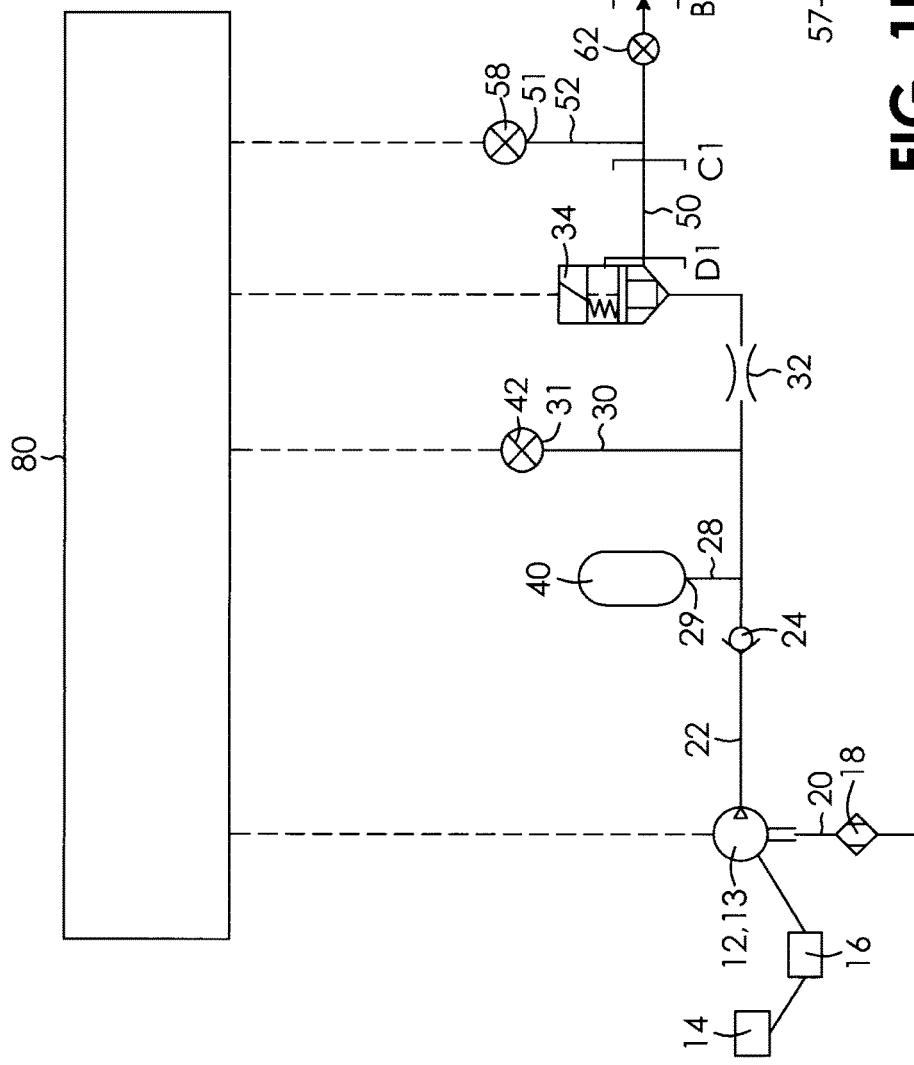
FIG. 1A is a schematic view of the remote depth sensor system of the present technology.
FIG. 1B shows a cross section at line B1.
FIG. 1C shows a cross section at line C1.
FIG. 1D shows a cross section at line D1.

System:

A pneumatic depth sensor system for remotely sensing the depth of bodies of water, including, for example, but not limited to, lakes, rivers, streams, reservoirs, ponds, tailing ponds, treatment plant ponds, bogs, and swamps, generally referred to as 10 is shown in FIG. 1A. A regulated source of pressured gas 12, preferably an air compressor 13, is preferably powered by solar panels 14 or a combination of batteries 16 and solar panels 14. An air dryer 18 provides a dry source of air to the compressor 13 through an ambient gas line 20. A supply gas line 22 delivers compressed air to a check valve 24 and is therefore in fluid communication with the check valve 24. The supply gas line 22 delivers the compressed air, and is therefore in fluid communication with an expansion tank line 28, a first pressure sensor line 30, which is downstream from the expansion tank line 28, an optional snubber valve 32, which is downstream from the first pressure sensor line 30, and a modulated pneumatic normally-closed electronic solenoid valve 34, which is downstream from the snubber valve 32. The snubber valve 32 can contribute to providing a fixed volume of gas to the modulated pneumatic normally-closed electronic solenoid valve 34.

The expansion tank line 28 delivers compressed air to an expansion tank 40, which is at the terminus 29 of the expansion tank line 28 and is therefore in fluid communication with the expansion tank line 28. Similarly, the first pressure sensor line 30 delivers compressed air to a first pressure sensor 42, which is at the terminus 31 of the first pressure sensor line 30 and is therefore in fluid communication with the first pressure sensor 42.

A bubbler gas line 50 is in fluid communication with the modulated pneumatic normally-closed electronic solenoid valve 34 and a second pressure sensor line 52, which is downstream from the modulated pneumatic solenoid valve 34. The bubbler outlet 54 of the bubbler gas line 50 is in fluid communication with the ambient environment 56. The second pressure sensor line 52 delivers compressed air to a second pressure sensor 58, which is at the terminus 51 of the second pressure sensor line 52 and is therefore in fluid communication with the second pressure sensor 58. There is an optional fluid pressure sensor 62 attached to the bubbler gas line 50 in the vicinity of the bubbler outlet 54. The optional fluid pressure sensor 62 is a lower accuracy, fast response pressure sensor used for controlling the airflow to assist in controlling the modulated pneumatic normally-closed electronic solenoid valve 34 in conditions where a fast response time is desirable. As shown in FIGS. 1B and 1C, the bubbler outlet 54 has the same inside diameter 57 as the gas line 22, 50 inside diameter 59.

Each of the air compressor 13, the first and second pressure sensors 42, 58, and the modulated pneumatic solenoid valve 34 are in electronic communication with a microprocessor 80. The air compressor 13 is preferably a 12 Volt Direct Current (DC), 8 Amp, 10% duty cycle (1 minute on, 9 minute off), −40 to +70 degree C. operating range compressor. The gas lines are preferably about 3.175 mm inside diameter tubes, but can range from about 1.58 mm to about 12.7 mm and all diameters in between. The expansion tank 40 is preferably a one liter expansion tank 40, but could range from about 0.25 L to about 5 L and all volumes in between. The pressure sensors 42, 58 are preferably piezo-resistive transducers, 0-700 kPa (0-101.5 PSI), 0.2-4.7 Volt DC output, differential pressure, dual port pressure sensors Model MPX5700DP from Freescale®. The modulated pneumatic solenoid valve is preferably corrosion resistant, with 0.110 spade terminals, normally closed, 2 way, manifold mount, 12 Volt DC, silicone seals, #10-32 threaded port electronic pneumatic solenoid valve Model CR-ET-2M-12-S from Clippard®. The modulated pneumatic normally-closed electronic solenoid valve 34 has a large orifice 88 (about 0.635 mm inside diameter to about 3 mm inside diameter) (see FIG. 1D) with a rapid response time of about 5 to about 10 milliseconds (msec). This is a normally-closed valve. Without being bound to theory, a response time of 10 msec or less (about 1 msec) allows the valve 34 to be modulated to provide the desired flow rate for producing bubbles. Hence, a rapid response time, or rapidly oscillating, or rapidly changing position refers to a time of less than about 10 milliseconds. The large diameter of the orifice 88 greatly reduces the chance of it being partially or completely occluded. The rapid response time allows for the modulated pneumatic normally-closed electronic solenoid valve 34 to be virtually either open or closed as the rate of opening and closing is very high. The rapidity at which it opens and closes allows gas flow to be regulated thereby overcoming the shortcomings in accuracy normally provided by a large orifice. The use of this valve reduces or eliminates the need for calibration of the air flow because the controlling element is a modulated normally-closed solenoid valve rather than a very fine fixed orifice. The solenoid open/close duty cycle is what determines the air flow and it can be precisely controlled by the micro-controller.

Figure 2:
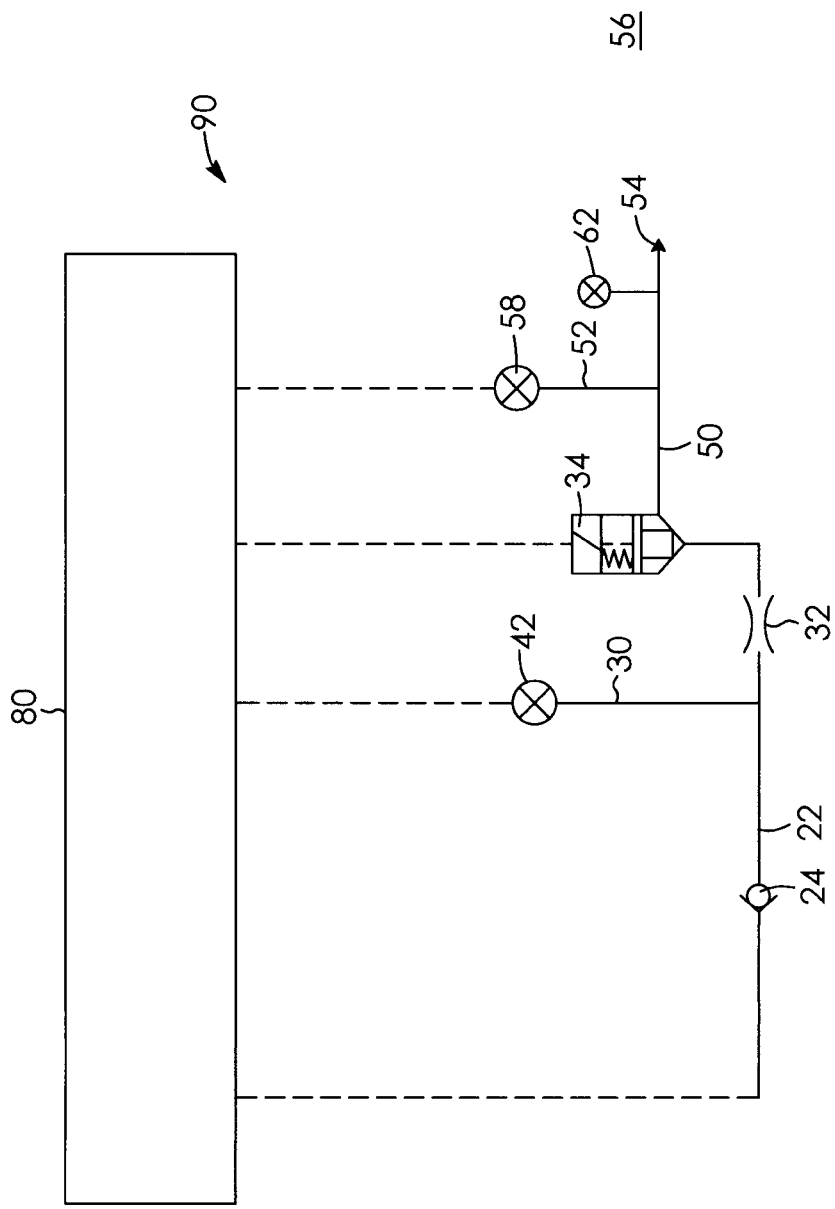
FIG. 2 is a schematic view of the depth sensor of the present technology.

The depth sensor component of the system 10, generally referred to as 90 is shown in FIG. 2. It includes the supply gas line 22, check valve 24, the first pressure sensor line 30, the first pressure sensor 42, the normally-closed electronic solenoid valve 34, the bubbler gas line 50 with its bubbler outlet 54, the second pressure sensor line 52, the second pressure sensor 58, the microprocessor 80 and the optional snubber valve 32. Again, there is an optional fluid pressure sensor 62 attached to the bubbler gas line 50 in the vicinity of the bubbler outlet 54.

Figure 3:
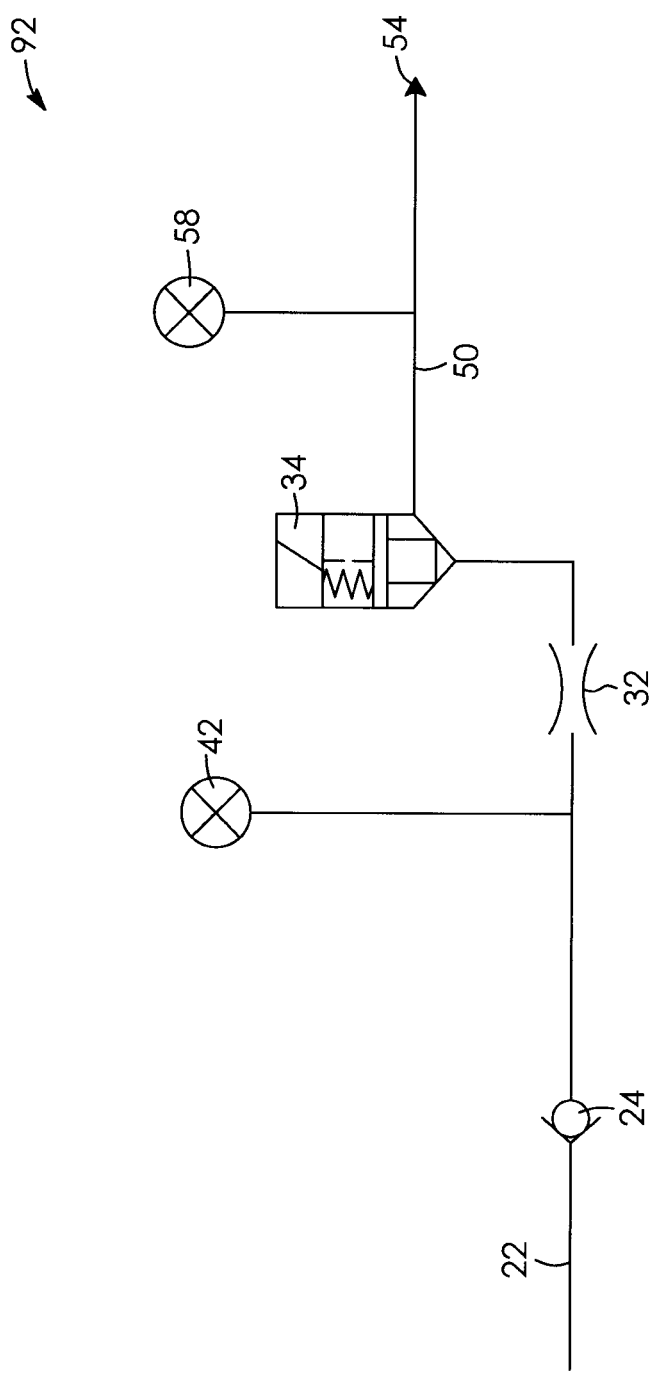
FIG. 3 is a schematic view of the gas supply system of the present technology.

The gas supply system, generally referred to as 92 is shown in FIG. 3. It includes the supply gas line 22, the check valve 24, the first pressure sensor 42, the optional snubber valve 32, the normally-closed electronic solenoid valve 34, the bubbler gas line 50 with its bubbler outlet 54, and the second pressure sensor 58.

Figure 4:
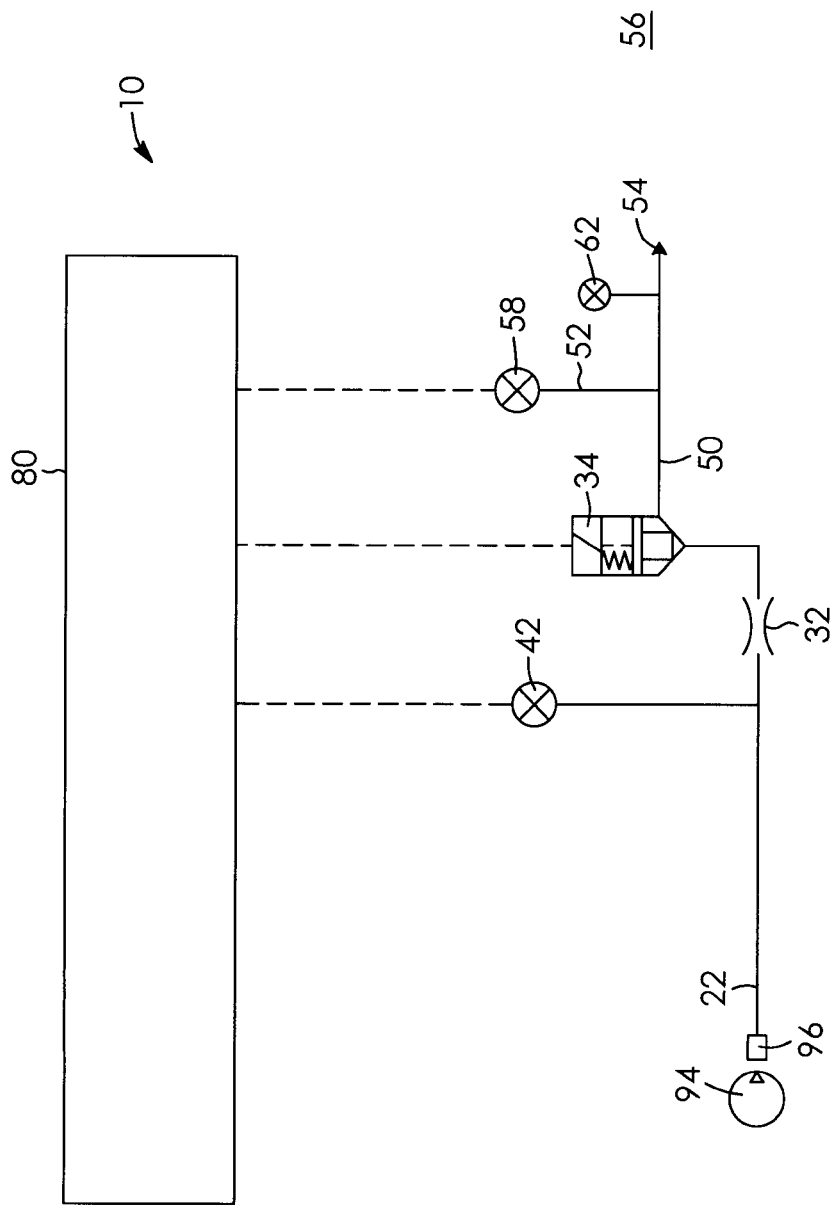
FIG. 4 is a schematic view of an alternative embodiment of the present technology.

In an alternative embodiment, as shown in FIG. 4, the air compressor 13, dryer 18, check valve 24 and expansion tank 40 are replaced with a tank of compressed gas 94 and a regulator 96. The remainder of the depth sensor system 10 is the same as for the first embodiment i.e. the rest of the depth sensor component 90 and the rest of the gas supply system 92 is the same as for the first embodiment.

Figure 5:
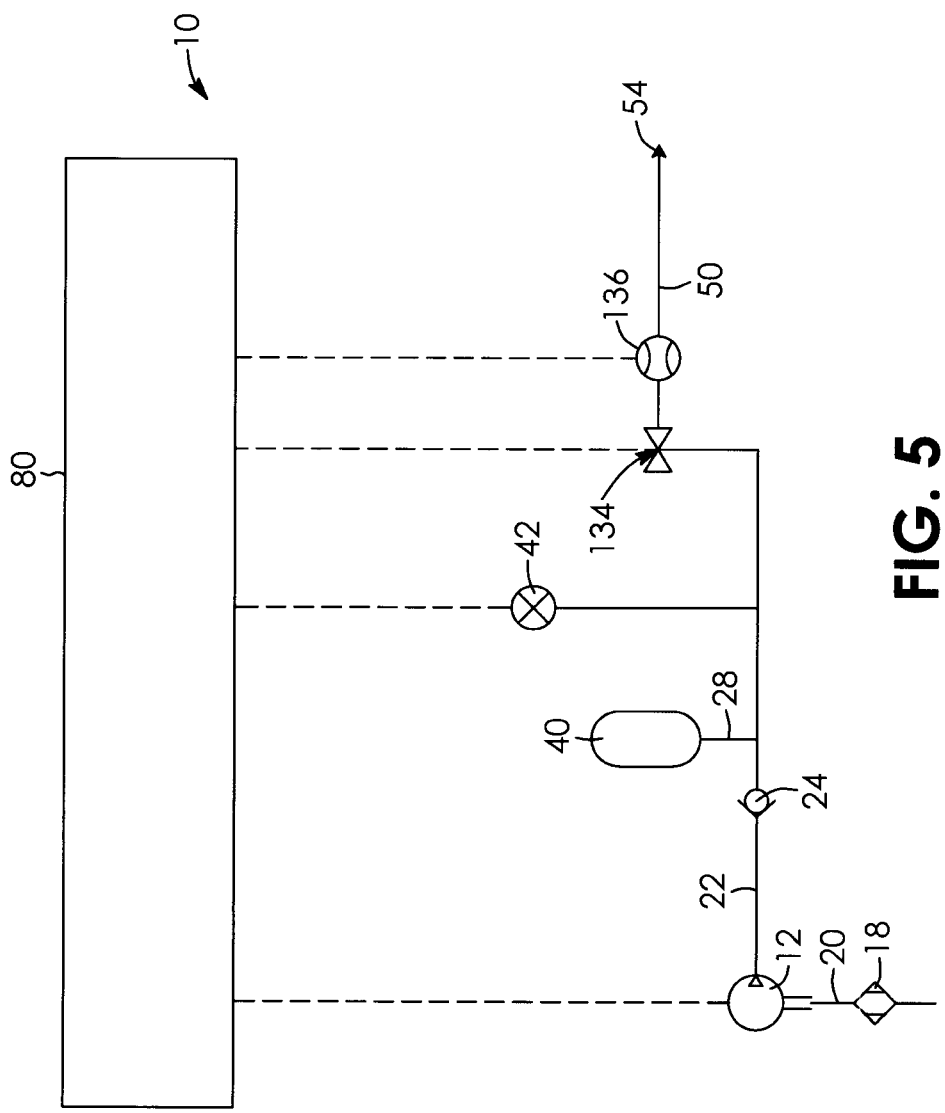
FIG. 5 is a schematic view of another alternative embodiment of the present technology.

In another embodiment, shown in FIG. 5, the normally-closed electronic solenoid valve 34 and optional snubber valve 32 are replaced with an electronic needle valve 134. An optional flow sensor 136 is downstream in the bubbler gas line 50. Both the electronic needle valve 134 and the flow sensor 136 are in electronic communication with the microprocessor 80, as is the first pressure sensor 42. This embodiment may include the air compressor 13 or the source of compressed gas 94 and regulator 96.

Figure 6:
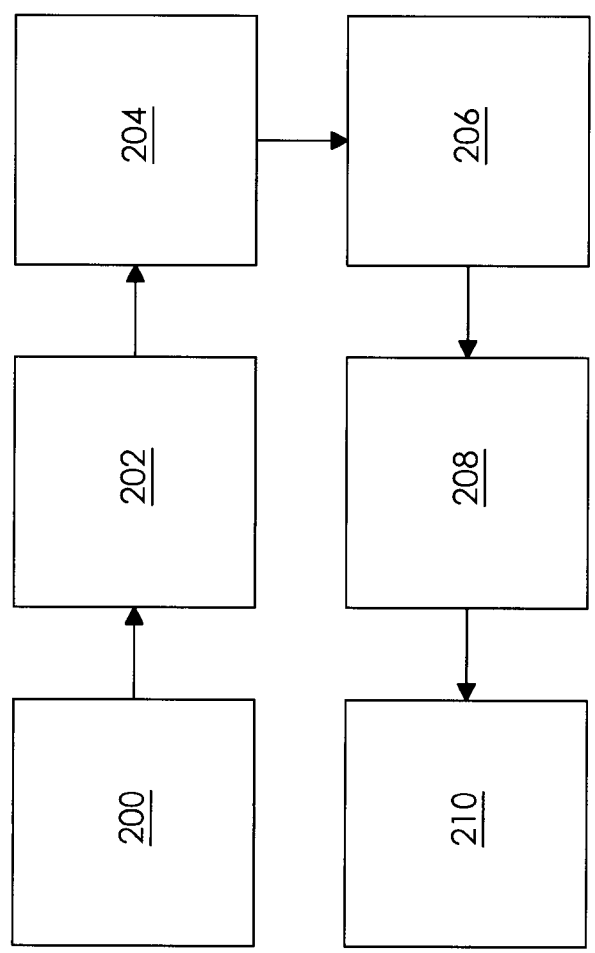
FIG. 6 is a block diagram of the method of the present technology.

Method of Operation:

In general, the methodology, as shown in FIG. 6, utilizes a regulated source of pressurized gas on the surface of the body of water (or proximate to the body of water), gas lines, pressure sensors and a modulated normally-closed electronic solenoid valve, with at least the bubbler outlet retained at the bottom of the body of water. The depth sensor is pressurized 200 until gas starts to bubble 202 out of the bubbler outlet. At that point the pressure at the second pressure sensor is the pressure at the bottom of the pond. From this, the depth of the liquid can be determined, assuming that the density of the fluid is known. The second pressure sensor output is measured 206 periodically by the microprocessor and the liquid depth is calculated 208 and made available 210 to logging and telemetry systems by electronic serial data interface.

In the preferred embodiment, the regulated source of pressurized gas is an air compressor under control of the microprocessor. Gas pressure is modulated by the modulated normally-closed electronic solenoid pneumatic valve under control of the microprocessor. The pressure is modulated by opening and closing the orifice. As noted above, it is, for all intents and purposes, strictly open or strictly closed. The time frame in which the orifice is open can be varied with the software. The shorter the duty cycle, the lower the gas flow and the more accurate the measurement. The time open is between about 10 to about 250 milliseconds, with about 10 milliseconds providing the greatest accuracy. If the water level is changing quickly the open time and the closed time can be changed to accurately track the depth changes on the fly.

Initially the expansion tank is at atmospheric pressure. At start up the microcontroller measures pressures at the first pressure sensor and the second pressure sensor and controls the air compressor to maintain a constant differential pressure P1–P2, where P1 is the pressure measured at the first pressure sensor and P2 is the pressure measured at the second pressure sensor. The differential pressure is maintained between about 3 pounds per square inch (PSI) and about 7 PSI and all pressures therebetween. The maximum operating absolute pressure of the system is limited by the pressure rating of the first and second pressure sensors and other components. Using the disclosed components, the system can operate at up to about 101.5 PSI allowing water depth measurements of up to about 71.3 m. Greater depths could be measured if components with greater pressure ratings are used.

When a suitable pressure differential is achieved the microcontroller begins to modulate the open and close times of solenoid valve to adjust air flow to the bubbler outlet. An algorithm is used to determine the frequency and duty cycle of the modulation based on value of Pressure 2 and delta Pressure 2/delta time. This allows for rapid adjustment of the pressure in the gas lines, which in turn, allows for rapid reaction to changes in the depth of the fluid being measured.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A differential pressure depth sensor, for use with a regulated source of a compressed gas and a power source, for measuring depth of a fluid in a remote location, the depth sensor comprising a supply gas line, a first pressure sensor line, a first differential pressure, dual port pressure sensor, a rapidly oscillating electronic solenoid valve, a bubbler gas line, a second pressure sensor line, a second differential pressure, dual port pressure sensor and a microprocessor, the supply gas line in fluid communication with the first pressure sensor line, and the electronic solenoid valve, the bubbler gas line in fluid communication with the electronic solenoid valve and with the second pressure sensor line, and terminating in a bubbler outlet, the bubbler outlet having an inside diameter of 8 mm to 12.7 mm, the first and second pressure sensor lines in fluid communication with the first and second differential pressure, dual port pressure sensors, respectively, the first differential pressure, dual port pressure sensor upstream from the electronic solenoid valve, the second differential pressure, dual port pressure sensor downstream from the electronic solenoid valve, the microprocessor in electronic communication with the first and the second differential pressure, dual port pressure sensors and the electronic solenoid valve, the microprocessor configured to: modulate pressure and flow rate of the compressed gas by instructing the electronic solenoid valve to oscillate rapidly between an opened and a closed position, to measure a pressure difference between the first differential pressure, dual port pressure sensor and the second differential pressure, dual port pressure sensor; and to maintain the pressure difference between the first differential pressure, dual port pressure sensor and the second differential pressure, dual port pressure sensor at 3 to 7 pounds per square inch.

2. The depth sensor of claim 1, further comprising an expansion tank, the expansion tank in fluid communication with the gas supply line.

3. The depth sensor of claim 2 further comprising a logging and telemetry system, which is in electronic communication with the microprocessor.

4. A pneumatic differential pressure depth sensor system for use with a power source, the sensor system for remotely reporting on a depth of a body of fluid, the system comprising a regulated source of compressed gas, a first differential pressure, dual port pressure sensor upstream from a differential pressure, rapidly oscillating electronic solenoid valve, a second differential pressure, dual port pressure sensor downstream from the electronic solenoid valve and a bubbler outlet, which has an inside diameter of 8 mm to 12.7 and is downstream from the second pressure sensor, the bubbler outlet for locating a bottom of the body of fluid, the depth sensor system under control of a microprocessor, the microprocessor in electronic communication with the first and second differential pressure, dual port pressure sensors and the electronic solenoid valve, and configured to instruct the electronic solenoid valve to oscillate rapidly between an opened and a closed position; to measure a pressure difference between the first differential pressure, dual port pressure sensor and the second differential pressure, dual port pressure sensor, and to maintain the difference in pressure at 3 to 7 pounds per square inch.

5. The pneumatic depth sensor system of claim 4, further comprising an expansion tank, the expansion tank upstream from the first differential pressure, dual port pressure sensor and downstream from the regulated source of compressed gas.

6. The pneumatic depth sensor system of claim 5 further comprising a logging and telemetry system, which is in electronic communication with the microprocessor.

7. A method of remotely measuring a depth of a body of fluid, the method comprising:
utilizing a regulated source of pressurized gas, a gas supply system, and a microprocessor in electronic communication with the gas supply system, the gas supply system including: a supply gas line; a bubbler gas line terminating in a bubbler outlet, which has an inside diameter of 8 mm to about 12.7 mm; a first pressure sensor in fluid communication with the supply gas line; a second pressure sensor in fluid communication with the bubbler gas line; and a differential pressure, rapidly oscillating electronic solenoid valve in fluid communication with and located between the supply gas line and the bubbler gas line, downstream from the first pressure sensor and upstream from the second pressure sensor;
locating the bubbler outlet at the bottom of the body of fluid; pressurizing the gas supply system to expel a stream of bubbles from the bubbler outlet; and, under control of the microprocessor;
rapidly oscillating the electronic solenoid valve between a fully open position and a fully closed position;
maintaining a pressure difference between the first pressure sensor and the second pressure sensor of 3 to 7 pounds per square inch;
measuring a differential pressure;
and calculating a depth of the body of fluid.

8. The method of claim 7, wherein an output from the second pressure sensor is measured periodically by the microprocessor to determine the depth of the body of fluid.

9. The method of claim 8, further comprising reporting the depth of the body of fluid.

10. The method of claim 9, wherein reporting is to a logging and telemetry system.

* * * * *